US012401689B2

(12) United States Patent
Jones

(10) Patent No.: US 12,401,689 B2
(45) Date of Patent: Aug. 26, 2025

(54) CENTRALIZED MANAGEMENT OF POLICIES FOR NETWORK-ACCESSIBLE DEVICES

(71) Applicant: Sophos Limited, Abingdon (GB)

(72) Inventor: Craig Robert Jones, Carmarthen (GB)

(73) Assignee: Sophos Limited, Abingdon (GB)

( * ) Notice: Subject to any disclaimer, the term of this patent is extended or adjusted under 35 U.S.C. 154(b) by 256 days.

(21) Appl. No.: 18/152,483

(22) Filed: Jan. 10, 2023

(65) Prior Publication Data

US 2023/0336591 A1 Oct. 19, 2023

Related U.S. Application Data

(60) Provisional application No. 63/331,292, filed on Apr. 15, 2022.

(51) Int. Cl.
*H04L 9/40* (2022.01)

(52) U.S. Cl.
CPC ............. *H04L 63/20* (2013.01); *H04L 63/10* (2013.01); *H04L 63/1416* (2013.01); *H04L 63/1425* (2013.01)

(58) Field of Classification Search
CPC ..... H04L 63/20; H04L 63/10; H04L 63/1416; H04L 63/1425
See application file for complete search history.

(56) References Cited

U.S. PATENT DOCUMENTS

| 10,834,141 | B1* | 11/2020 | Chud | H04L 63/107 |
| 2020/0396258 | A1* | 12/2020 | Jeyakumar | G06N 20/00 |
| 2021/0092149 | A1* | 3/2021 | Carlson | H04L 63/0236 |
| 2021/0126938 | A1* | 4/2021 | Trost | G06F 21/552 |

OTHER PUBLICATIONS

Dynamic deployment of context-aware access control policies for constrained security devices by Toutain et al.; published 2011 (Year: 2011).*

* cited by examiner

*Primary Examiner* — Vu V Tran
(74) *Attorney, Agent, or Firm* — IP Spring

(57) ABSTRACT

Various aspects related to methods, systems, and computer readable media for centralized management of policies for network-accessible devices. An example method for deploying network policies to one or more computing devices or services can include receiving a request to analyze a network-accessible item for malicious activity, determining that the analyzed network-accessible item is associated with the malicious activity, presenting, at a client device, a listing of selectable devices and services responsive to the determination, wherein the listing is populated based on identifying data of the user, receiving at least one selection from the listing of selectable devices and services, creating at least one network access policy based on the at least one selection, and, deploying the at least one network access policy to a device or service associated with the at least one selection.

20 Claims, 11 Drawing Sheets

CENTRALIZED MANAGEMENT OF POLICIES FOR NETWORK-ACCESSIBLE DEVICES

CROSS-REFERENCE TO RELATED APPLICATIONS

This application claims the benefit of priority to U.S. Provisional Application Ser. No. 63/331,292, filed on Apr. 15, 2022, entitled "CENTRALIZED MANAGEMENT OF POLICIES FOR NETWORK-ACCESSIBLE DEVICES," the entire contents of which are hereby incorporated by reference herein.

TECHNICAL FIELD

Embodiments relate generally to threat management in a computer network, and more particularly, to methods, systems, and computer readable media for centralized management of policies for network-accessible devices.

BACKGROUND

With continually evolving computer security threats, there remains a need for automated, semi-automated, and manual techniques to quickly mitigate security threats.

SUMMARY

Implementations of this application relate to methods, systems, and computer readable media for centralized management of policies for network-accessible devices.

In one aspect, a computer-implemented method to deploy network policies to one or more computing devices or services is disclosed. The computer-implemented method comprises: receiving a request from a user to analyze a network-accessible item for malicious activity; determining that the network-accessible item is associated with the malicious activity; presenting, at a client device, a listing of selectable devices or services, wherein the listing is populated based on identifying data of the user; receiving at least one selection from the listing of selectable devices or services; creating at least one network access policy based on the at least one selection; and deploying the at least one network access policy to a device or service associated with the at least one selection.

In some implementations, presenting the listing of selectable devices or services comprises: presenting the listing of selectable devices and services in a graphical user interface (GUI), wherein the GUI comprises one or more selectable fields representative of the devices or services.

In some implementations, presenting the listing of selectable devices or services comprises: presenting the listing of selectable devices and services through a web-based interface rendered by a centralized server.

In some implementations, the network-accessible item to be analyzed for malicious activity is one or more of: a web address; one or more files; or a hash value of the one or more files.

In some implementations, the web address is associated with a domain name, a website, a uniform resource locator (URL), or an Internet Protocol (IP) address.

In some implementations, determining that the analyzed network-accessible item is associated with the malicious activity comprises determining that the network-accessible item matches one or more criteria associated with items that are known to be harmful to the client device.

In some implementations, the listing of selectable devices or services comprises a listing of one or more of: endpoint devices; proxies; firewalls; switches; or gateway devices.

In some implementations, the listing of selectable devices or services comprises a listing of one or more of: e-mail services; firewall services; anti-malware services; or anti-virus services.

In some implementations, the at least one network access policy is a network access policy configured to prevent a corresponding network-accessible device from accessing the analyzed network-accessible item.

In some implementations, the at least one network access policy is a network access policy configured to cause a corresponding service to prevent user accounts or devices from accessing the analyzed network-accessible item.

In some implementations, the deployed at least one network access policy is implemented by the device or service associated with the at least one selection.

According to another aspect, a computer program product is disclosed. The computer program product comprises one or more non-transitory computer-readable media with instructions stored thereon that, responsive to execution by one or more processing devices, causes the one or more processing devices to perform operations comprising: receiving a request to analyze a network-accessible item for malicious activity; determining that the analyzed network-accessible item is associated with the malicious activity; presenting, at a client device, a listing of selectable devices and services responsive to the determination, wherein the listing is populated based on identifying data of the user; receiving at least one selection from the listing of selectable devices and services; creating at least one network access policy based on the at least one selection; and deploying the at least one network access policy to a device or service associated with the at least one selection.

In some implementations, presenting the listing of selectable devices and services comprises: presenting the listing of selectable devices and services in a graphical user interface (GUI), wherein the GUI comprises one or more selectable fields representative of the devices and services.

In some implementations, presenting the listing of selectable devices and services comprises: presenting the listing of selectable devices and services through a web-based interface rendered by a centralized server.

In some implementations, determining that the analyzed network-accessible item is associated with the malicious activity comprises determining that the network-accessible item matches one or more criteria associated with items that are known to be harmful to the client device.

In some implementations, the listing of selectable devices and services comprises a listing of one or more of: endpoint devices, proxies, firewalls, switches, or gateway devices.

In some implementations, the listing of selectable devices and services comprises a listing of one or more of: e-mail services, firewall services, anti-malware services, or anti-virus services.

In some implementations, the at least one network access policy is a network access policy configured to prevent and/or prohibit a corresponding network-accessible device from accessing the analyzed network-accessible item, and further configured to instruct a corresponding service to prevent and/or prohibit user accounts or devices from accessing the analyzed network-accessible item.

In some implementations, the deployed at least one network access policy is consumed and implemented by the device or service associated with the at least one selection.

According to another aspect, a threat management computer system to manage security threats on an enterprise network is disclosed. The computer system comprising: a memory with instructions stored thereon; one or more processing devices, coupled to the memory, the one or more processing devices configured to access the memory and execute the instructions; and one or more network devices coupled to the one or more processing devices and configured to receive requests issued by a plurality of client devices, wherein the instructions cause the one or more processing devices to perform operations including: receiving a request to analyze a network-accessible item for malicious activity; determining that the analyzed network-accessible item is associated with the malicious activity; presenting, at a client device of the plurality of client devices, a listing of selectable devices and services responsive to the determination, wherein the listing is populated based on identifying data of the user; receiving at least one selection from the listing of selectable devices and services; creating at least one network access policy based on the at least one selection; and deploying the at least one network access policy to a device or service associated with the at least one selection.

DETAILED DESCRIPTION

One or more implementations described herein relate to centralized management of policies for network-accessible devices and/or services. Generally, security products (e.g., security software suites, security consoles, etc.) provide different protections, and can be managed at a central threat management facility. Currently, the many security products are managed separately, so that when an administrator becomes aware of an indicator of compromise (IOC), the administrator configures policies for each type of protection. For example, Endpoint Protection, Server Protection, Firewalls, Wireless Access Points, Switches, Web Protection, and Email security are typically configured separately. An IOC might be separately manually configured for each type of protection, with a policy applicable to that type of protection.

It follows that as security products are scaled to large network environments, such as large enterprise networks, management of individual policies based upon individual security products and particular IOCs becomes troublesome. For example, a network administrator may implement one policy for one type of IOC or endpoint. However, that policy may not be suitable for a different endpoint or a different type of device. This, the network administrator may need to create an additional policy or update existing policies in order to continually address emerging threats.

The below detailed description is presented in reference to these and other scenarios where network administrators can benefit from centralized management of policies, and automated tools to deploy policies based on suspicious content, malicious content, and/or security threats, to a plurality of network-accessible devices.

Figure 1:
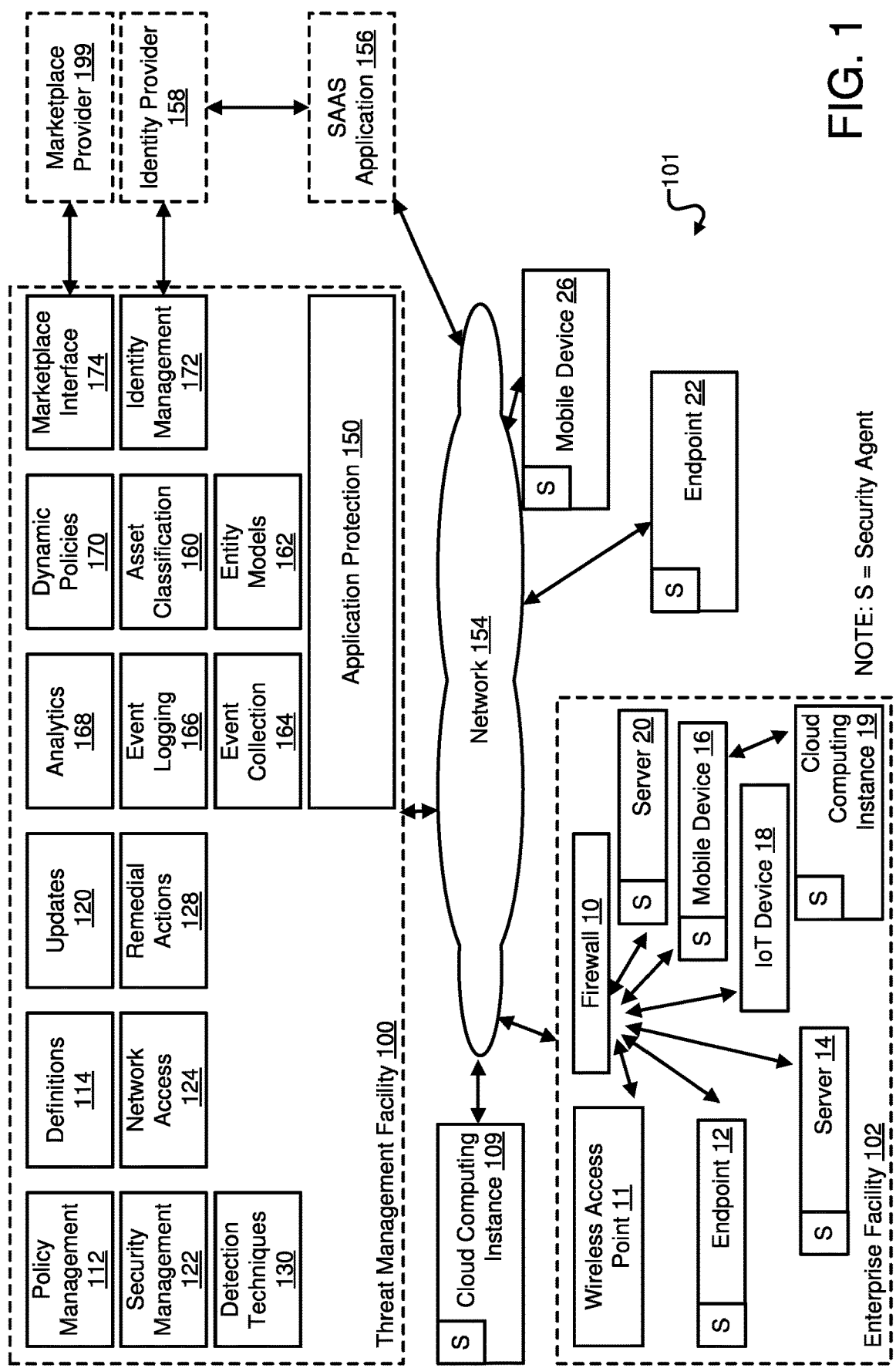
FIG. 1 is a diagram of an example enterprise network threat management system, in accordance with some implementations.

FIG. 1 depicts a block diagram of a threat management system 101 providing protection against a plurality of threats, such as malware, viruses, spyware, cryptoware, adware, ransomware, trojans, spam, intrusion, policy abuse, improper configuration, vulnerabilities, improper access, uncontrolled access, and more. A threat management facility or network monitor 100 may communicate with, coordinate, and control operation of security functionality at different control points, layers, and levels within the system 101. A number of capabilities may be provided by the threat management facility 100, with an overall goal to monitor security threats and indicators of compromise, and to deploy policies across the network to endpoints/hosts and/or services, based upon the security threats and indicators of compromise. The threat management facility 100 can also monitor network traffic to identify potential threats and/or deploy policies based on the monitoring. The threat management facility 100 may be or may include a gateway such as a web security appliance that is actively routing and/or assessing the network requests for security purposes. Another overall goal is to provide protection needed by an organization that is dynamic and able to adapt to evolving threats to devices using the enterprise network. According to various aspects, the threat management facility 100 may provide protection from a variety of threats to a variety of compute instances in a variety of locations and network configurations.

As one example, users of the threat management facility 100 may define and enforce policies that control access to and use of compute instances, networks, and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications, and data available from servers, applications, and data permitted to be accessed by endpoints, and network resources and data permitted to be run and used by endpoints. The threat management facility 100 may provide many different services, and policy management may be offered as one of the services.

Turning to a description of certain capabilities and components of the threat management system 100, an example enterprise facility 102 may be or may include any networked computer-based infrastructure. For example, the enterprise facility 102 may be corporate, commercial, organizational, educational, governmental, or the like. As home networks can also include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown as one example, and it will be understood that there may be any number of compute instances, less or more of each type of compute instances, and other types of compute instances.

As shown, the example enterprise facility includes a firewall 10, a wireless access point 11, an endpoint 12, a server 14, a mobile device 16, an appliance or Internet-of-Things (IoT) device 18, a cloud computing instance 19, and a server 20. One or more of 10-20 may be implemented in hardware (e.g., a hardware firewall, a hardware wireless access point, a hardware mobile device, a hardware IoT device, a hardware etc.) or in software (e.g., a virtual machine configured as a server or firewall or mobile device). While FIG. 1 shows various elements 10-20, these are for example only, and there may be any number or types of elements in a given enterprise facility. For example, in addition to the elements depicted in the enterprise facility 102, there may be one or more gateways, bridges, wired networks, wireless networks, virtual private networks, virtual machines or compute instances, computers, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In various implementations, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122. According to some implementations, the marketplace provider 199 is a trusted security vendor that can provide one or more security software products to any of the compute instances described herein. In this manner, the marketplace provider 199 may include a plurality of trusted security vendors that are used by one or more of the illustrated compute instances.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

The identity provider 158 may provide user identity information, such as multi-factor authentication, to a software-as-a-service (SaaS) application. Centralized identity providers may be used by an enterprise facility instead of maintaining separate identity information for each application or group of applications, and as a centralized point for integrating multifactor authentication. The identity management facility 172 may communicate hygiene, or security risk information, to the identity provider 158. The identity management facility 172 may determine a risk score for a particular user based on events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

The threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as SaaS application 156. The SaaS application 156 may be an application that is used by but not operated by the enterprise facility 102. Example commercially available SaaS applications 156 include Salesforce, Amazon Web Services (AWS) applications, Google Apps applications, Microsoft Office 365 applications, and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

Aspects of the threat management facility 100 may be provided as a stand-alone solution. In other implementations, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In some implementations, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an implementation, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an implementation, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

According to one implementation, the security management facility 122 may provide for network monitoring and access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. According to various implementations, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

The security management facility 122 may also provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

The security management facility 122 may provide also for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In some implementations, some reputation information may be stored on a compute instance 10-26, and other reputation data available through cloud lookups to an application protection lookup database, such as may be provided by application protection 150.

In some implementations, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. Feedback may enable the evaluation or profiling of client actions that are violations of policy that may provide a predictive model for the improvement of enterprise policies as well as detection of emerging security threats.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In some implementations, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. The threat management facility 100 may also include at least one blocking service 180 in operative communication with the policy management facility 112. The blocking service 180 may also be configured to assist in implementation of the rules or policies managed by the policy management facility 112.

Example rules include access permissions associated with networks, applications, compute instances, users, content, data, and the like. The policy management facility 112 may use a database, a text file, other data store, or a combination to store policies. A policy database may include a block list, a black list, an allowed list, a white list, and more. As non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources.

The blocking service 180 may aid in distribution and/or implementation of the rules and policies upon communication by the policy management facility 112. Example policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In one implementation, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement and/or to the blocking service 180 for implementation.

The policy management facility 112 may also include policies that are generated based upon analysis of suspicious files, links, URLs, and other network-accessible items. As used herein, a network-accessible item can include, for example, a file, a file hash, a domain name, an IP address, a domain name, a URL, or other identifying data. It is noted that in some instances, a network-accessible item may also be considered a type of "threat sample." However, for clarity of discussion "network-accessible item" is used to refer to any threat sample, web address, file, file hash, signature, or other item that can be analyzed through the threat management facility 100 to determine whether the item is a malicious or suspicious item that can affect the functioning, operation, or other aspect of a computer device or computer-implemented service.

In some implementations, network-accessible items that may be analyzed for suspicious and/or malicious content may also be blocked from access through implementation of a policy and/or through "blocking" by the blocking service 180. Various items may be analyzed and/or blocked. For example, compute instances, operating systems, applications, data, networks, network connections, and/or users may be blocked with the blocking service 180 and/or the policy management facility 112.

With regard to blocking compute instances, various types and forms may be blocked. For example, compute instances, hosts, and/or attributes can be blocked. The blocking may enable the restriction of access based on compute instance types, desktop computers, laptop computers, other mobile computing devices, cloud computing instances, gateways, firewalls, wireless access points, attributes of compute instances (e.g., amount of memory), sensors available on the device (e.g., GPS/location information), device encryption status, system health, and/or other compute instance data.

With regard to blocking operating systems, various types and forms may be blocked. For example, operating systems and attributes may be blocked. The blocking may enable restriction of access based on operating system types, versions, updates, security status, security configuration, and/or other operating system data.

With regard to blocking applications, various types and forms may be blocked. For example, applications and attributes of applications may be blocked. The blocking may enable restriction of access based on application vendor, digital signature information, application type, status (e.g., endpoint security software health), a number of applications running, update status of an application, and/or other application data.

With regard to blocking data, various types and forms may be blocked. For example, data content, data attributes, and data types may be blocked. The blocking may enable restriction of access based on files, file properties (e.g., file names, file size, file hashes) registry entries, specific content or data in file, encryption status, time/date when modified, time/data when created, number of access requests, naming conventions, and/or other data.

With regard to blocking networks and/or network connections, various types and forms may be blocked. For example, networks, network attributes, network connections, and network sessions may be blocked. The blocking may enable restriction of access based on network addresses (e.g., IPv4 address or IPv6 address), certificates and certificate info, domain registration information, volume of data, IPs, URLs, ports, file shares accessed, network process data, usage/connection times (e.g., time of day, duration, etc.), location, and/or other network data.

With regard to blocking users, various types and forms may be blocked. For example, users and user attributes may be blocked. The blocking may enable restriction of access based on active directory account data, third-party authentication data, 2-factor authentication data, device or token data, user groups, organization hierarchy, location, usage history, "need to know," job position, method of authentication, client/system configuration, permissions granted, type of account (e.g., administrative, daemon, roles), and/or other user data.

It is noted that various other forms and types of blocking may be enabled which combine any of the above forms, and in which sometimes omit other forms, may also be applicable. Such blocking may be effectuated through the policy management facility 112 and/or the blocking service 180.

The policy management facility 112 may generate (or facilitate the distribution and deployment of) the policies (e.g., and blocking lists) based upon network-accessible items that are determined to be malicious and/or network-accessible items or attributes selected by a user/administrator. The policies may be configured for one or more network-accessible devices, where the policy may be specific to the type of protected device. The policy management facility 112 may then communicate the determined and/or created policies to the blocking service 180 and/or the one or more protected devices, where each is policy is then consumed and implemented by a security agent associated with the protected device and/or endpoint. In some implementations, a separate blocking microservice (e.g., blocking service 181) may be in communication with the policy management facility 112 and/or blocking service 180, and configured to consume and/or implement the distributed policy.

The threat management facility 100 may provide configuration management as an aspect of the policy management facility 112, the security management facility 122, the blocking service 180, or a combination thereof. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

The policy management facility 112 may also require update management (e.g., as provided by the update facility 120). Update management for the security facility 122 and policy management facility 112 may be provided directly by the threat management facility 100, or, for example, by a hosted system. In some implementations, the threat management facility 100 may also provide for patch management, where a patch may be an update to an operating system, an application, a system tool, or the like, where one of the reasons for the patch is to reduce vulnerability to threats.

In some implementations, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In one implementation, the policy management facility 112 and the security facility 122 may work in concert with the update management facility 120 to provide information to the enterprise facility's 102 network and/or compute instances 10-26. In various implementations, policy updates, security updates, and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for recognizing features of known or potentially malicious code and/or known or potentially malicious network activity. Definitions also may include, for example, code or data to be used in a classifier, such as a neural network or other classifier that may be trained using machine learning. Updated code or data may be used by the classifier to classify threats. In some implementations, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need-to-know data, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In some implementations, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An example event may be communication of a specific packet over the network. Another example event may be identification of an application that is communicating over a network. These and other events may be used to determine that a particular endpoint includes or does not include actively updated security software from a trusted vendor.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility 122. Observations or inferences about events may also be logged by the event logging facility 166.

When a threat or other policy violation is detected by the security management facility 122, the remedial action facility 128 may be used to remediate the threat. Remedial action may take a variety of forms, including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
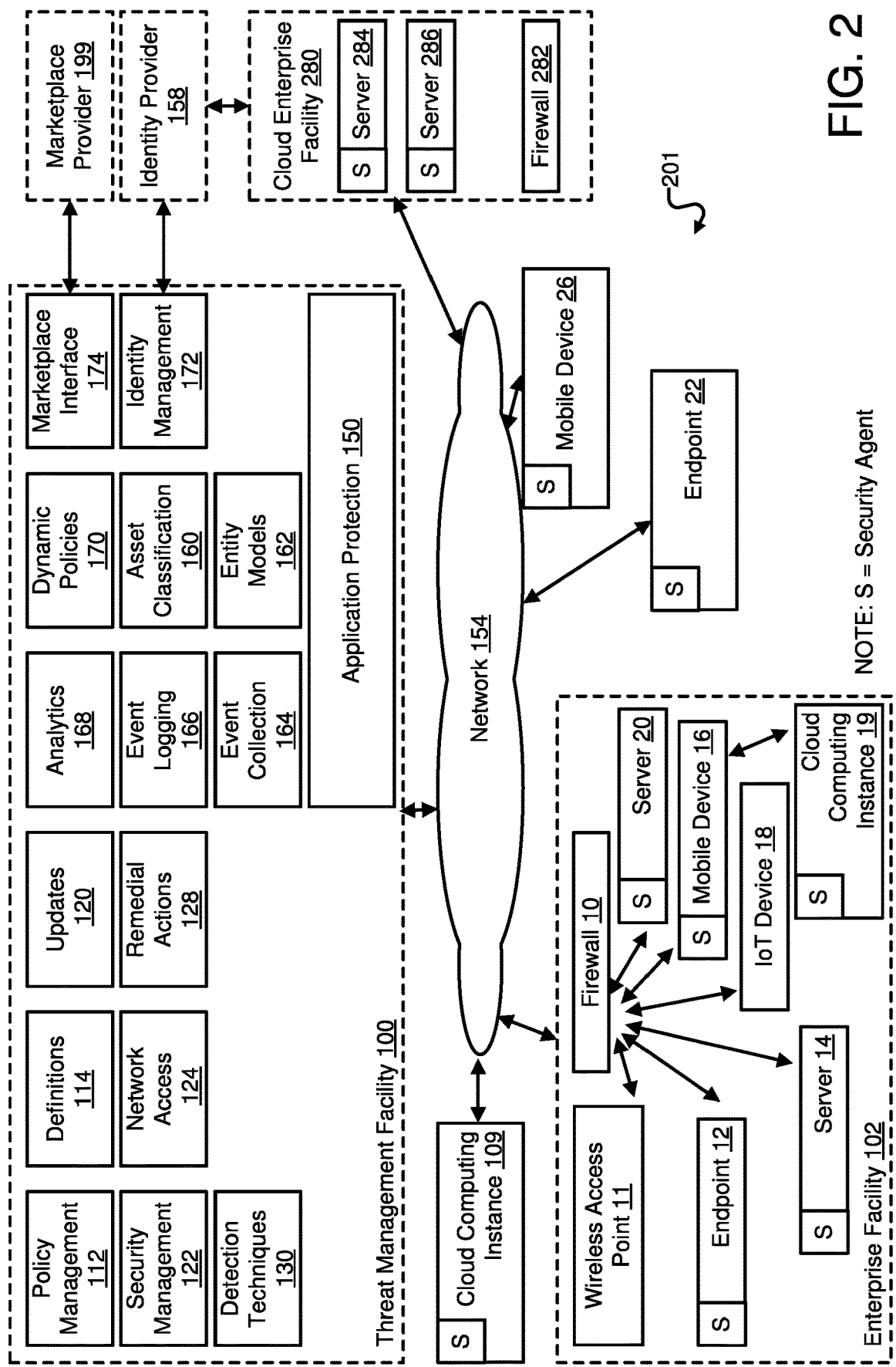
FIG. 2 is a diagram of an example enterprise network threat management system, in accordance with some implementations.

FIG. 2 depicts a diagram of a threat management system 201 such as any of the threat management systems described herein, and additionally including a cloud enterprise facility 280. Generally, systems 101 and 201 are similar; therefore, superfluous description of like elements is omitted herein for the sake of brevity and clarity of disclosure.

The cloud enterprise facility 280 of system 201 may include servers 284, 286, and a firewall 282. The servers 284, 286 on the cloud enterprise facility 280 may run one or more enterprise applications and make them available to the compute instances 10-26 of enterprise facility 102. It should be understood that there may be any number of servers 284, 286 and firewalls 282, as well as other compute instances in a given cloud enterprise facility 280. It also should be understood that a given enterprise facility may use either or both of SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
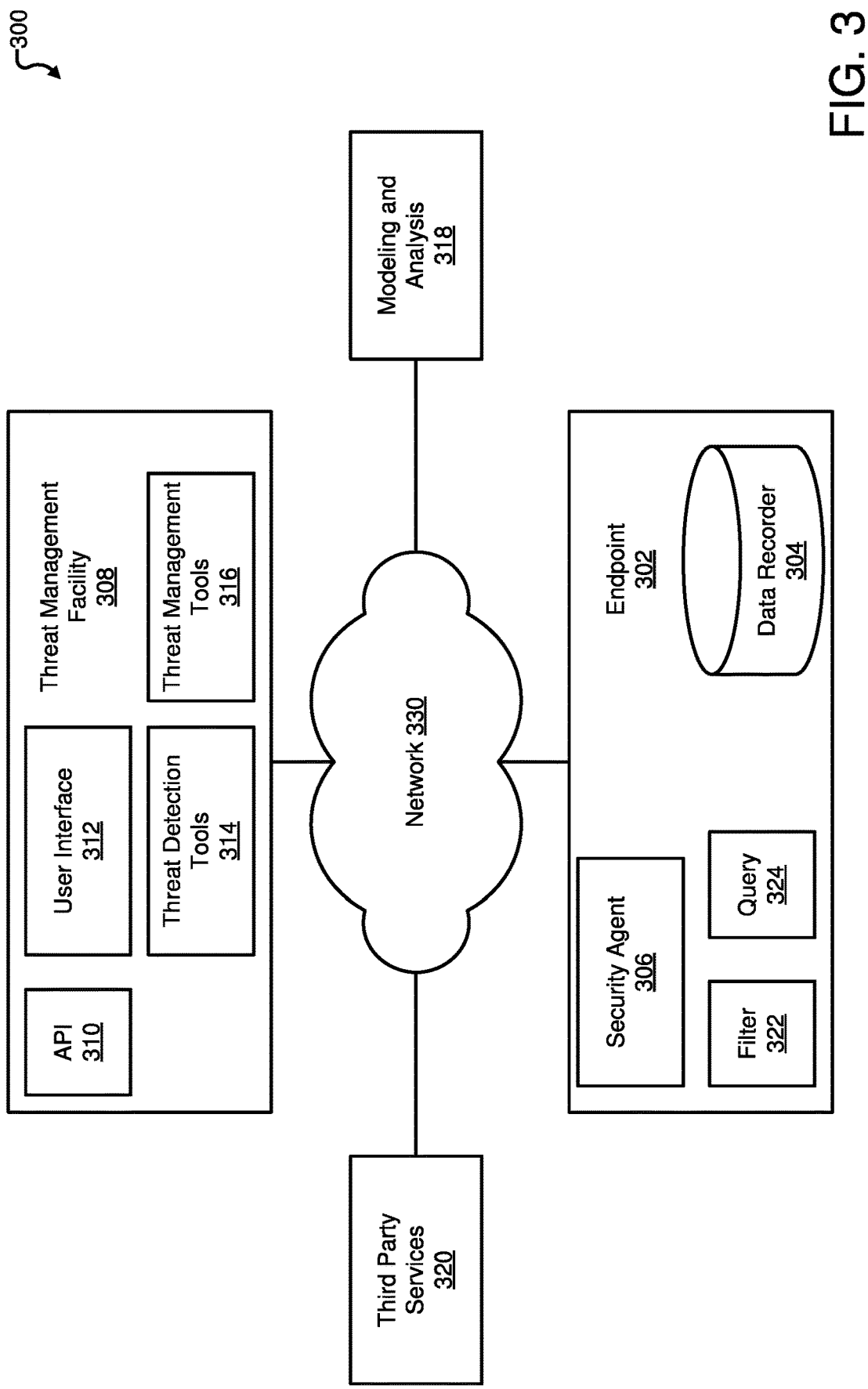
FIG. 3 is a schematic of an example enterprise network threat management system, in accordance with some implementations.

FIG. 3 shows a system 300 for enterprise network threat detection. System 300 may include one or more endpoints, e.g., endpoint 302; a threat management facility 308 (e.g., similar to facility 100 of FIGS. 1 and 2); a modeling and analysis platform 318; and one or more third party services 320 (hosted on third party computing devices, all coupled via network 330. The system 300 may use any of the various tools and techniques for threat management described herein.

Endpoints such as the endpoint 302 may log events in a data recorder 304, e.g., a database or other storage. A local agent on the endpoint 302 such as the security agent 306 may filter this data and feed a filtered data stream to a threat management facility 308 such as a central threat management facility or any of the other threat management facilities described herein. Furthermore, a local microservice, such as the blocking service 181, may perform blocking and policy management functions as described above with reference to FIGS. 1 and 2.

The threat management facility 308 can locally or globally tune filtering by local agents based on the current data stream, and can query local event data recorders for additional information where necessary or helpful in threat detection or forensic analysis. The threat management facility 308 may also (or alternatively) store and deploy a number of security tools such as a web-based user interface that is supported by machine learning models to aid in the identification and assessment of potential threats by a human user. This may, for example, include machine learning analysis of new network traffic, models to provide human-readable context for evaluating potential threats, and any of the other tools or techniques described herein. More generally, the threat management facility 308 may include one or more of a variety of threat management tools 316 to aid in the detection, evaluation, and remediation of threats or potential threats.

The threat management facility 308 may perform a range of threat management functions such as any of those described herein. In some implementations, the threat management facility 308 may provide an application programming interface 310 for third party services 320 from trusted security vendors, a user interface 312 for access to threat management and network administration functions, one or more threat detection tools 314, as well as the blocking service 180.

In general, the application programming interface 310 may support programmatic connections with third party services 320 that facilitate exchange of data between threat management facility 308 and third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, policy administration, network administration, audit, configuration and so forth. This user interface 312 may generally facilitate curation of potential threats, e.g., by presenting threats along with other supplemental information, and providing controls for a user to dispose of such threats as desired, e.g., by creating one or more policies based on threats, by permitting execution or access, by denying execution or access, or by engaging in remedial measures such as sandboxing, quarantining, vaccinating, and so forth. The user interface 312 may also facilitate the deployment of policies to devices and endpoints through a centralized interface.

The threat detection tools 314 may include any of the threat detection tools, algorithms, or techniques described herein, or any other tools for detecting threats or potential threats within an enterprise network. This may, for example, include network behavioral tools, machine learning models, and so forth. In general, the threat detection tools 314 may use network traffic data caused by endpoints within the enterprise network, as well as any other available context such as heartbeats, to detect malicious software or potentially unsafe conditions for a network or endpoints connected to the network. In one aspect, the threat detection tools 314 may usefully network activity data from a number of endpoints (including, e.g., network components such as gateways, routers and firewalls) for improved threat detection in the context of complex or distributed threats. The threat detection tools 314 may also analyze network-accessible items submitted through the user interface 312 (or another interface), in some implementations. The threat detection tools 314 may also or instead include tools for reporting to a separate modeling and analysis platform 318, e.g., to support further investigation of security issues, creation or refinement of security status detection models or algorithms, review, and analysis of security breaches and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances described herein. This may, for example, include end-user computing devices, mobile devices, firewalls, gateways, servers, routers, and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, updating policies, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network and the like. The level of reporting may also or instead be based on currently available network and computing resources, or any other appropriate context.

In another aspect, the endpoint 302 may include a query interface 324 so that remote resources such as the threat management facility 308 can query the data recorder 304 for additional information. This may include a request for specific events, activity for specific computing objects, or events over a specific time frame, or some combination of these. Thus for example, the threat management facility 308 may request all changes to the registry of system information for the past forty eight hours, all files opened by system processes in the past day, all network connections or network communications within the past hour, or any other parameterized request for activities monitored by the data recorder 304. In another aspect, the entire data log, or the entire log over some predetermined window of time, may be requested for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. Additionally, the threat management facility can effectuate remediation of endpoints when suspicious activity is detected.

Figure 4:
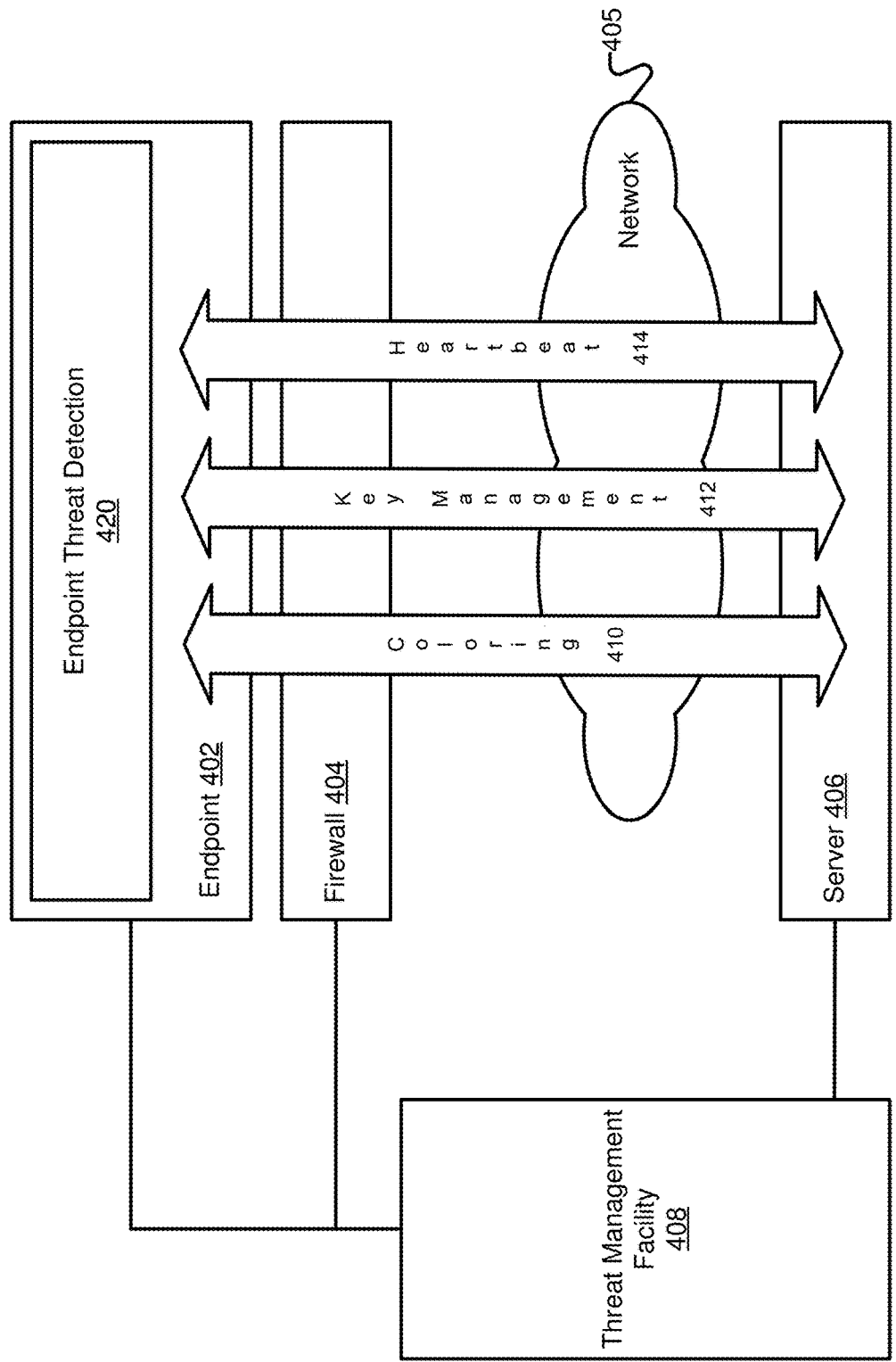
FIG. 4 is a block diagram of an example enterprise network threat management system, in accordance with some implementations.

FIG. 4 is a block diagram of an enterprise network threat management system. In general, the system may include an endpoint 402, a firewall 404, a server 406, and a threat management facility 408 coupled to one another directly or indirectly through a data network 405, as described above. Each of the entities depicted in FIG. 4 may, for example, be implemented on one or more computing devices such as the computing device described herein. A number of systems may be distributed across these various components to support threat detection, such as a coloring system 410, a key management system 412, and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

In general, these monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted or otherwise modified. More generally, the cooperation of these systems enables a wide variety of reactive measures that can improve detection and remediation of potential threats to an endpoint.

Figure 5:
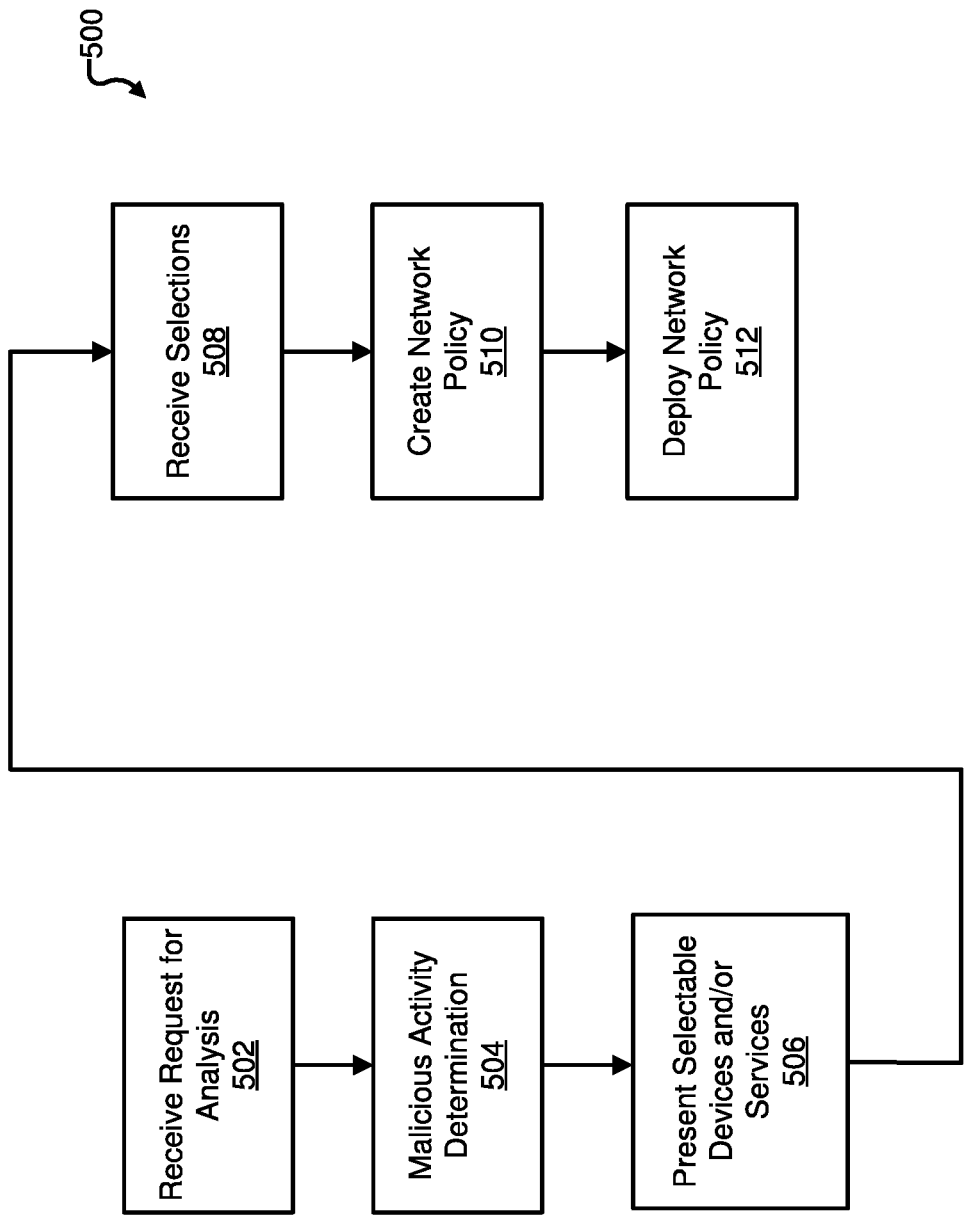
FIG. 5 is a flow diagram of an example method for deploying network policies to one or more computing devices or services, in accordance with some implementations.

FIG. 5 shows a flow chart of an example method 500 for deploying network policies to one or more computing devices or services. The method 500 may be implemented by one or more of the devices and/or systems illustrated in FIGS. 1-4 and is discussed by way of reference thereto. For example, the method 500 may be executed by a remote device, a threat management facility, a security agent executing on a user device, a blocking service 180, a blocking service 181, or any of the foregoing computing devices that may be in operative communication with the user device.

In general, various detection techniques are used to identify potential threats. For example, machine learning techniques may be used to evaluate suspiciousness of one or more network-accessible items submitted for analysis. For example, rules or heuristics may be used to evaluate suspiciousness of one or more network-accessible items. Policies may be created, updated, and/or deployed based upon the analysis. By creating and deploying policies based on the analysis, automated threat mitigation actions can be performed and/or human threat intervention can advantageously be directed toward contexts most appropriate for non-automated responses.

Method 500 may begin at block 502. At block 502, a request to analyze a network-accessible item may be received by the blocking service 180 or the blocking service 181. The request may be generated at, and transmitted from, a centralized threat management facility or other component, and may be facilitated by a user interface. The request may also be received automatically, for example, in response to a network-accessible item being received from an unknown device, an unknown domain, or other unknown criteria. The network-accessible item to be analyzed for malicious activity may be any network accessible item. In one implementation, the network-accessible item to be analyzed for malicious activity may be one or more of a web address (e.g., associated with a domain name, a website, Uniform Resource Locator (URL), or an Internet Protocol (IP) address), one or more files, or a hash value of the one or more files. The request may be submitted by a user or network administrator by selecting a graphical user interface (GUI) element such as a button for submission. The method may continue at block 504.

At block 504, a malicious activity determination may be made by the blocking service 180 or the blocking service 181. The malicious activity determination may include a determination that the network-accessible item is malicious in nature, is suspected of being malicious, and/or matches maliciousness criteria (e.g., threshold similarity with malicious items, similar network activity or pattern as a malicious item, etc.). In some implementations, the determination may be binary (e.g., malicious or not malicious), or may be a scale or percentage of likelihood that the network-accessible item is malicious. In some implementations, the blocking service 180 or the blocking service 181 may transmit one or more aspects of the network-accessible item to a trained machine learning model that is configured to output a maliciousness determination.

In some implementations, the determination may be made automatically by a threat management facility. The facility may use one or more models and/or one or more rules to determine whether an item is sufficiently suspicious to be blocked. In one alternative implementation, a determination may be made by a human analyst who is presented with a machine learning output or analysis output relating to the network accessible item, such as information about similar items, or decisions made by other analysts about similar items, and the human analyst may provide feedback to the machine learning model to facilitate the determination.

In some implementations, the determination may include determining that the network-accessible item matches one or more criteria associated with items that are known to be harmful to the client device, an endpoint, or another network-accessible device (e.g., endpoint devices, proxies, firewalls, switches, or gateway devices). In some implementations, the determination may include determining that the network-accessible item matches one or more criteria associated with items that are known to be harmful to the client device, and/or disrupt one or more services (e.g., e-mail services, firewall services, anti-malware services, or anti-virus services). In some implementations, the determination may include a historical analysis to determine whether the network-accessible item or a similar item has ever been analyzed before. In some implementations, the determination may include determining that an indicator of compromise is associated with the network-accessible item. The method continues at block 506.

At block 506, a listing of selectable devices and services may be presented at a user interface responsive to the determination. For example, if the determination is that the network-accessible item is malicious (or likely to be malicious), the listing may be presented at the user interface. In some implementations, the listing may be provided as a cautionary or informative measure regardless of the determination.

The listing may be populated based upon identifying information related to a user associated with the network-accessible item. For example, identity provider 158 and/or identity management facility 172 may provide devices and services that are associated with identifying data of the user. The identifying data of the user may be provided through the threat management facility 100, such that devices and services associated with the user may be correlated across the network 154.

In some implementations, presenting the listing of selectable devices and services includes presentation in a graphical user interface (GUI). The GUI can include one or more selectable fields representative of the devices and services. In some implementations, presenting the listing of selectable devices and services includes presentation of selectable devices and services through a web-based interface rendered by a centralized server or other computing device. In some implementations, the selectable devices and services may be individually selectable, selectable by groupings, and/or a combination of individually selectable and groupings of devices and services.

The presented listing may be in any suitable format, and according to any desired graphical display. In some implementations, the presented listing may be a ranked list of devices associated with a user. In some implementations, the listing of selectable devices and services includes a listing of one or more of: endpoint devices, proxies, firewalls, switches, or gateway devices. In some implementations, the listing of selectable devices and services comprises a listing of one or more of: e-mail services, firewall services, anti-malware services, or anti-virus services. Block 506 may be followed by block 508.

At block 508, one or more selections (or at least one selection) from the listing of selectable devices and services may be received by the blocking service 180 or the blocking service 181. The selections may be received sequentially, partially, automatically, and/or periodically based on manipulation and/or interaction with the GUI. The selections may also be received as a batch of selections upon an additional interaction with a submission element. The method may continue to block 510.

At block 510, at least one network access policy is created, at the policy management facility 112, based on the at least one selection that is received. In some implementations, the network access policy may be a network access policy configured to prevent and/or prohibit a corresponding network-accessible device from accessing the analyzed network-accessible item. In some implementations, the network access policy may be a network access policy configured to instruct a corresponding service to prevent and/or prohibit user accounts or devices from accessing the analyzed network-accessible item. In some implementations, the network access policy is configured to apply to similar network-accessible items received in the future (e.g., based a similar domain, a similar pattern of electronic mail or communication, a similar pattern of network activity, and/or other similarity metrics). The method may continue at block 512.

At block 512, the network access policy may be deployed by the policy management facility 112, the blocking service 180, or the blocking service 181. For example, the network access policy may be distributed to devices and/or services based upon the received at least one selection. In some implementations, the deployed network access policy is consumed and implemented by the device or service associated with the at least one selection. For example, the policy management facility 112 may deploy the network access policy to the devices and/or services, which may be received by a local blocking service 181. The deployed network access policy may be received by the devices and/or services, and may be implemented in a manner directed by the policy management facility 112, in some implementations. The implementation of the network access policy may include updating a current, active network access policy already deployed at the devices or services, or may be a new network access policy in addition to current, active network access policies of the devices or services, or may be a new network access policy encompassing at least policy details from existing policies and the newly deployed network access policy. The deployed network access policy may instruct a device and/or service to perform and/or take a particular action with regard to a particular activity and/or network-accessible item. For example, in one embodiment, the deployed network access policy may instruct selected devices and/or services to block computing objects related to a particular network-accessible item or one or more network-accessible items.

The network access policy deployment may be facilitated through the threat management facility 100, for example, through policy management facility 112, update management facility 120, the blocking service 180, or other suitable components and/or services.

In some implementations, an event graph may be used to identify computing objects that are related to an analyzed network-accessible item and/or a user submitting the item. An event graph can also be used to identify a root cause of a threat sample, and to identify other computing objects that are causally related to the root cause, to block the threat sample and/or network-accessible item. The event graph can be examined forward or backward to identify other computing objects that are causally related to the blocked object. Likewise, a root cause of a blocked object can be identified, and traversed forward to identify computing objects that are causally related to the analyzed network-accessible item and/or threat sample, such that the network access policy is deployed to said computing objects. In this manner, the event graph can also be used to aid in deployment of the network access policy. An example event graph is described more fully with reference to FIG. 8.

As described herein, a system for computer assisted identification of security threats may include a memory storing a security status detection model configured to evaluate a network-accessible item. The system may also include a threat management facility configured to apply the security status detection model to newly submitted network-accessible items. The system may also include a web server configured to display selectable devices and services associated with a user and/or the network-accessibly item. The web server may also be configured to create and deploy network access policies based upon analysis of the network-accessible item. The web server may also be configured to allow remedial actions such as quarantining or revocation of network access.

Figure 6A:
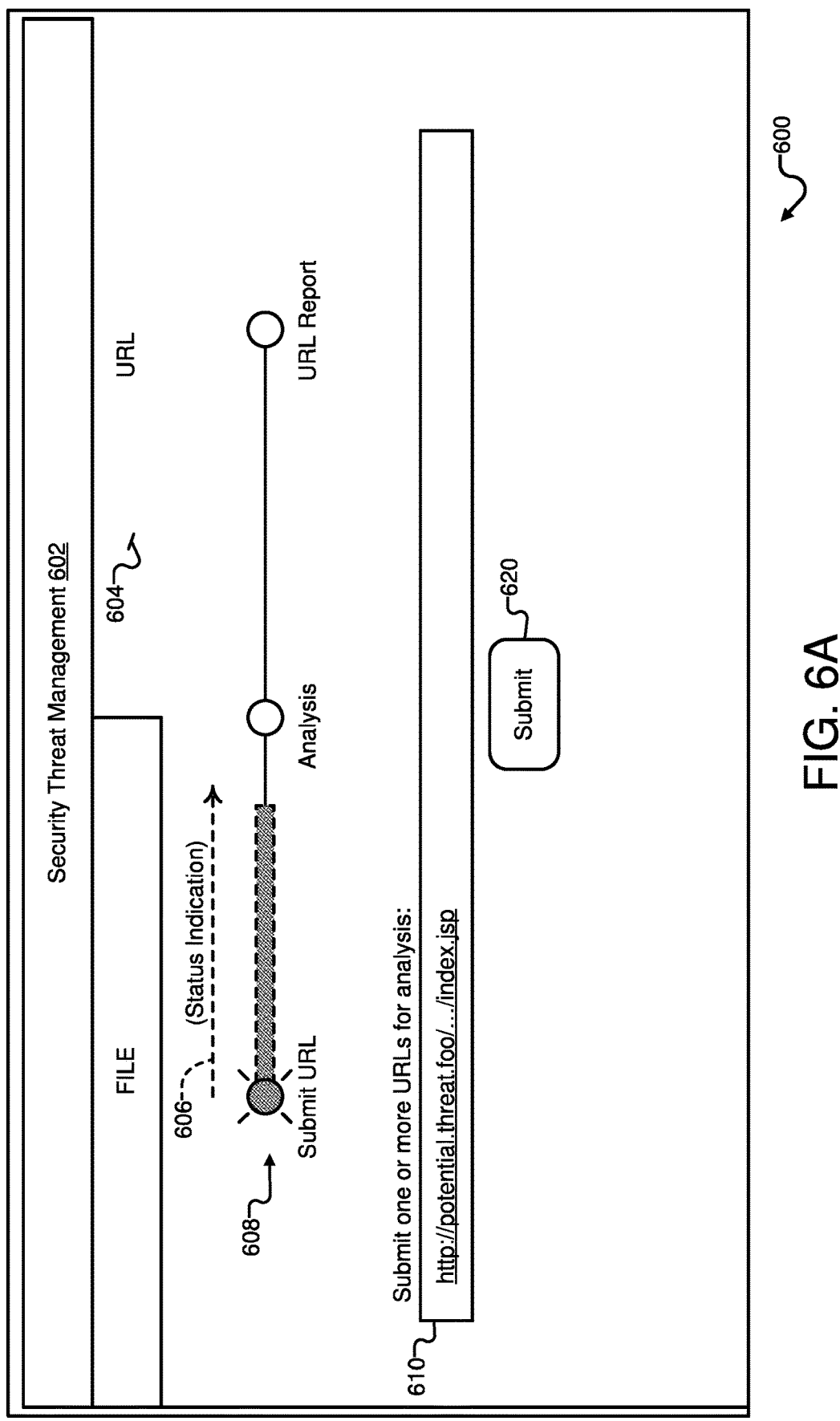
FIG. 6A is a diagram of an example user interface to manage enterprise network threats, in accordance with some implementations.

Turning to FIG. 6A, a diagram of an example user interface to manage enterprise network threats is illustrated. As shown, the user interface 600 may include a main console portion 602 configured to display an analysis interface 604. In this example, the analysis interface 604 is configured for analysis of network-accessible items including web addresses, IP addresses, URLs, and other similar addresses. A user may submit one or more network-accessible items for analysis through input interface element 610. Upon submission, for example through selection of submission element 620, status indication 606 may generate indications of the analysis at indicator 608.

Upon successful analysis, the user interface 600 may be updated to display new information that is presented to the user. For example, FIG. 6B is a diagram of an example user interface to manage enterprise network threats, in accordance with some implementations.

Figure 6B:
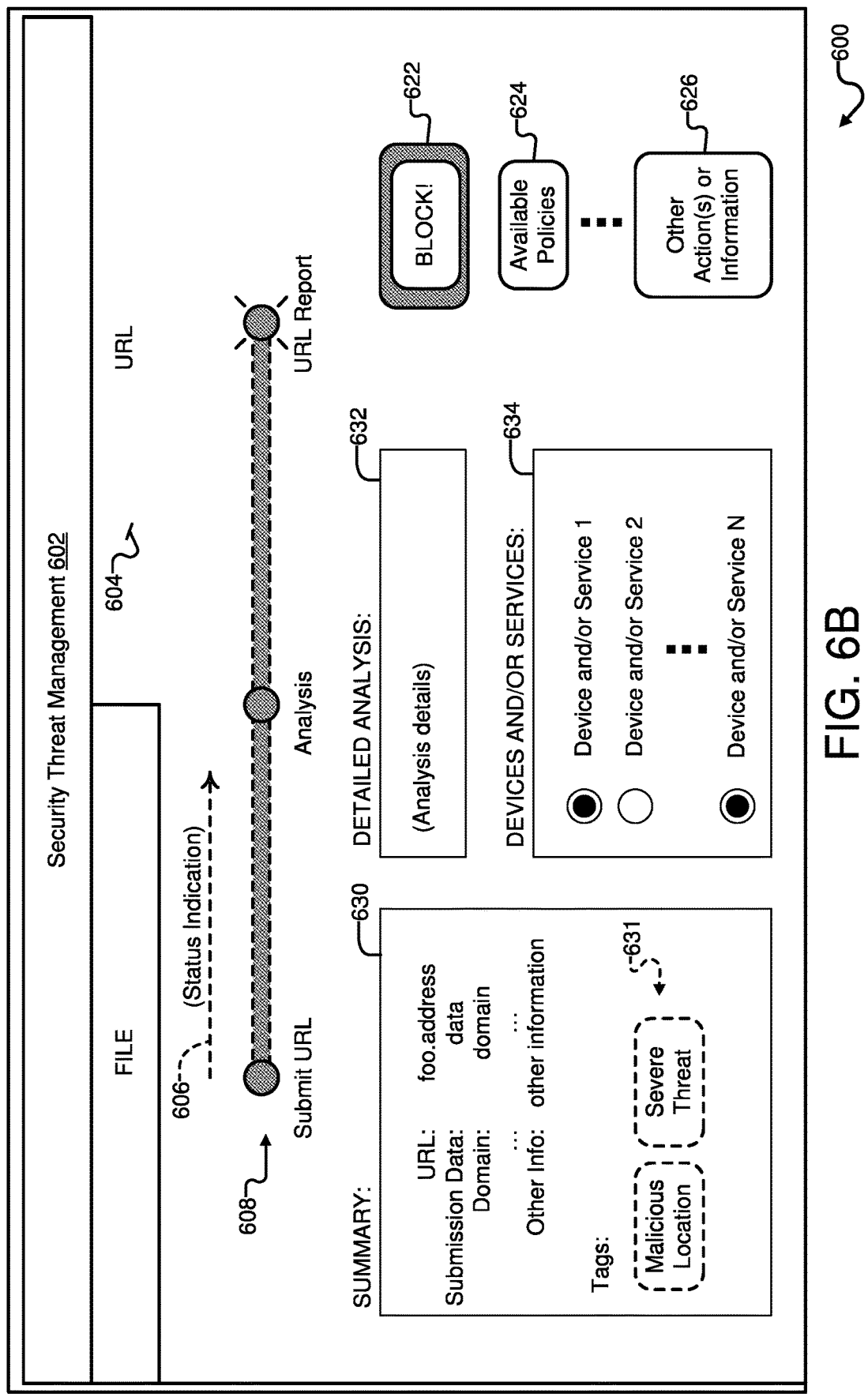
FIG. 6B is a diagram of an example user interface to manage enterprise network threats, in accordance with some implementations.

As shown in FIG. 6B, status indicator 608 is presented indicating completion of analysis of the one or more network-accessible items submitted. A summary section 630 may be populated with summary information related to the analysis. In some implementations, flags or tags 631 indicating a summary of the threat status of the network-accessible item may be prominently displayed for immediate view by the user. The flags or tags 631 may also be used in a database of potential threats for sorting and/or ranking potential threats.

The summary section may be also be populated with an estimate of suspiciousness. For example, the user interface may present particular features in the summary section 630 such as whether a network-accessible item is signed, whether the network-accessible item calls cryptographic libraries, and whether the network-accessible item inspects other processes. For each such feature, the user interface may further present the number of known good and known bad network-accessible items for that feature, or other summary information.

The features displayed may be a subset of features in a random forest over human-interpretable features that is selected based on relevance, e.g., how strongly indicative those features are of safety or suspiciousness. In one implementation, random forest may be used in method block 504 or other method blocks. In one implementation, this may include features that are most heavily weighted on a percentage basis toward safety or suspiciousness. In another implementation, this may include features with the largest number of relevant samples (e.g., higher up the decision tree). In another implementation, these and any other factors may be weighted or otherwise collectively evaluated to select a subset of features for display to a user. This approach may usefully assist a human user when evaluating an intermediate threat for manual disposition by providing a display of features that contribute more significantly or most significantly to the potential risk associated with a network-accessible item.

In another implementation, the user interface may provide a display of a random forest output (e.g., quantitative data about various human-interpretable features), or a display of most similar safe and unsafe network-accessible items, or some combination of these. For example, the user interface may provide one or more user controls for the user to select among these different analyses, and/or other analyses, contextual information, or other supplemental information, in addition to the simplified example interface portions illustrated.

A detailed analysis portion 632 may also be presented. The detailed analysis portion 632 may be populated with information and/or data specific to the network-accessible item that was analyzed. The detailed analysis portion 632 may be populated with granular information about features contributing to suspiciousness. For example, an analysis of a network-accessible item may return a 90% suspicion of malicious code, while a file path analysis may return a 57% suspicion, and a URL analysis may return a 77% suspicion. While an integrative model may combine these various features into a single estimate of suspiciousness or potential risk, the individual values may be useful to a user attempting to manually dispose of an intermediate threat. Furthermore, for any particular feature, a number of most similar events or network-accessible items for that feature may be displayed, with similarity evaluated using, e.g., a k-nearest neighbor algorithm or other algorithm for evaluating similarity within a feature space. These more granular estimates of suspiciousness may be presented in separate sub-elements, which may usefully be arranged in an accordion, a stacked group of drop-down lists, or any other suitable control element or combination of control elements that permits each type of estimate to be expanded or collapsed under user control.

A listing 634 with selectable devices and/or services associated with a user and/or the network-accessible item may also be presented. As shown, individual devices and/or services may be displayed with associated selection elements proximate thereto. Other forms of selection may also be applicable.

As further shown, control elements 622, 624, and 626 are provided for user control of policies associated with the selectable devices and/or services. For example, "block" control element 622 allows the submission of a blocking request whereby all selected devices and services receive a deployed network access policy (e.g., as described with reference to FIG. 5). "Available policies" element 624 may present an additional listing of available policies that can also be deployed. Furthermore, additional actions, information, statuses, and other displays may be requested by selection of other control elements, which have been grouped as single element 626 for clarity.

While FIG. 6A and FIG. 6B generally relate to network-accessible items such as network addresses, web addresses, URLs, and similar items, other item analysis is also applicable. For example, FIG. 7 illustrates example user interfaces associated with network-accessible items such as files, file hashes, and other similar items.

Figure 7A:
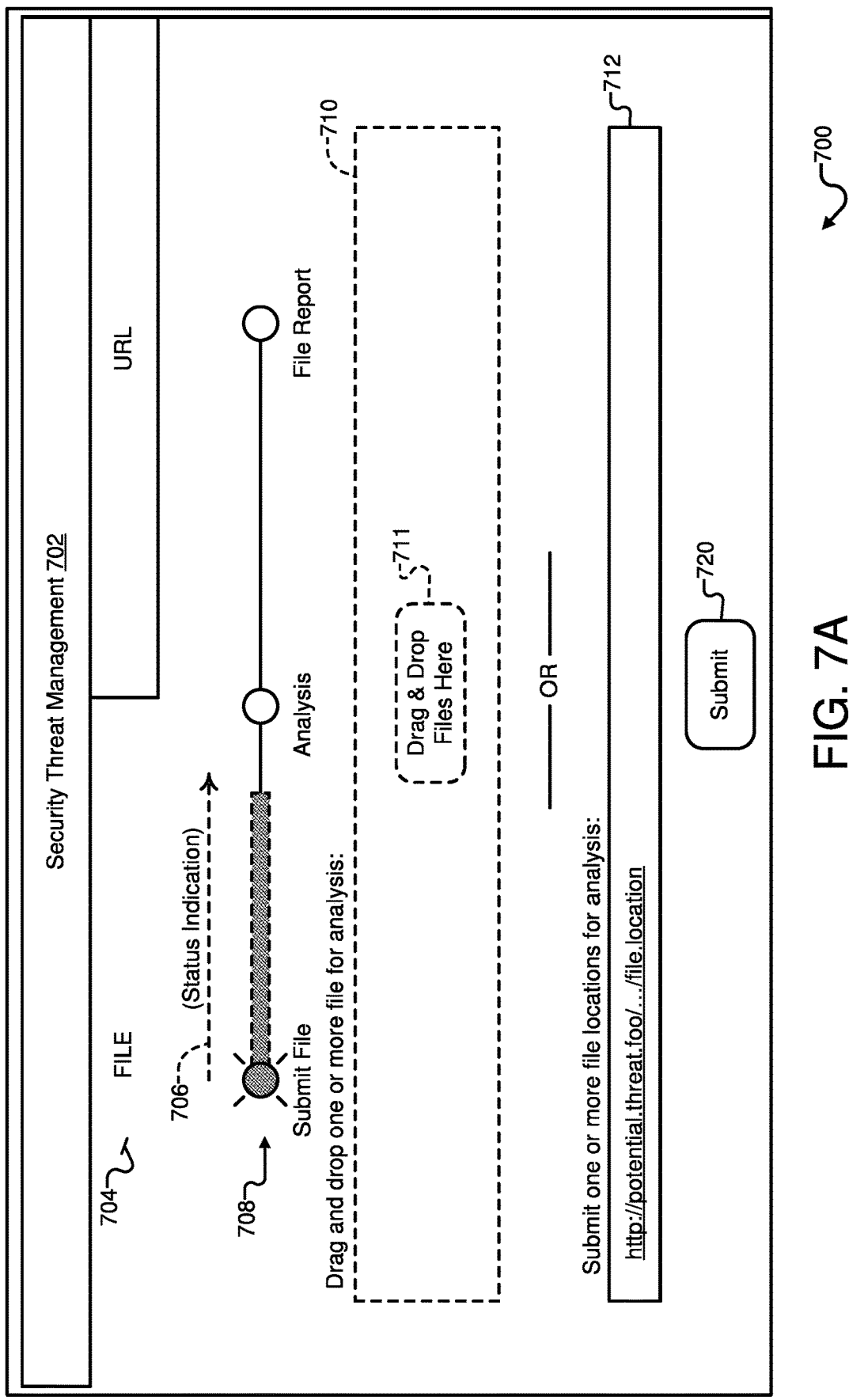
FIG. 7A is a diagram of an example user interface to manage enterprise network threats, in accordance with some implementations.

FIG. 7A is a diagram of an example user interface 700 to manage enterprise network threats, in accordance with some implementations. As shown, the user interface 700 may include a main console portion 702 configured to display an analysis interface 704. In this example, the analysis interface 704 is configured for analysis of network-accessible items including files, file hashes, and other similar items. A user may submit one or more network-accessible items for analysis through input interface element 710, 711, and/or 712. Upon submission, for example through selection of submission element 720, status indication 706 may generate indications of the analysis at indicator 708.

It is noted that elements 710, 711, and 712 allow for the uploading of one or more items for analysis. In this regard, a target of the upload may be a secure computer system configured to appropriately handle malicious content and items. For example, and without limitation, appropriate secure computer systems may include physical systems or virtual systems or a combination of physical and virtual systems. In one implementation, a virtualized computer system may receive the item for analysis such that physical systems are unaffected by the potentially malicious threat sample.

Upon successful analysis, the user interface 700 may be operable to reconfigure display such that new information is presented to the user. For example, FIG. 7B is a diagram of an example user interface to manage enterprise network threats, in accordance with some implementations.

Figure 7B:
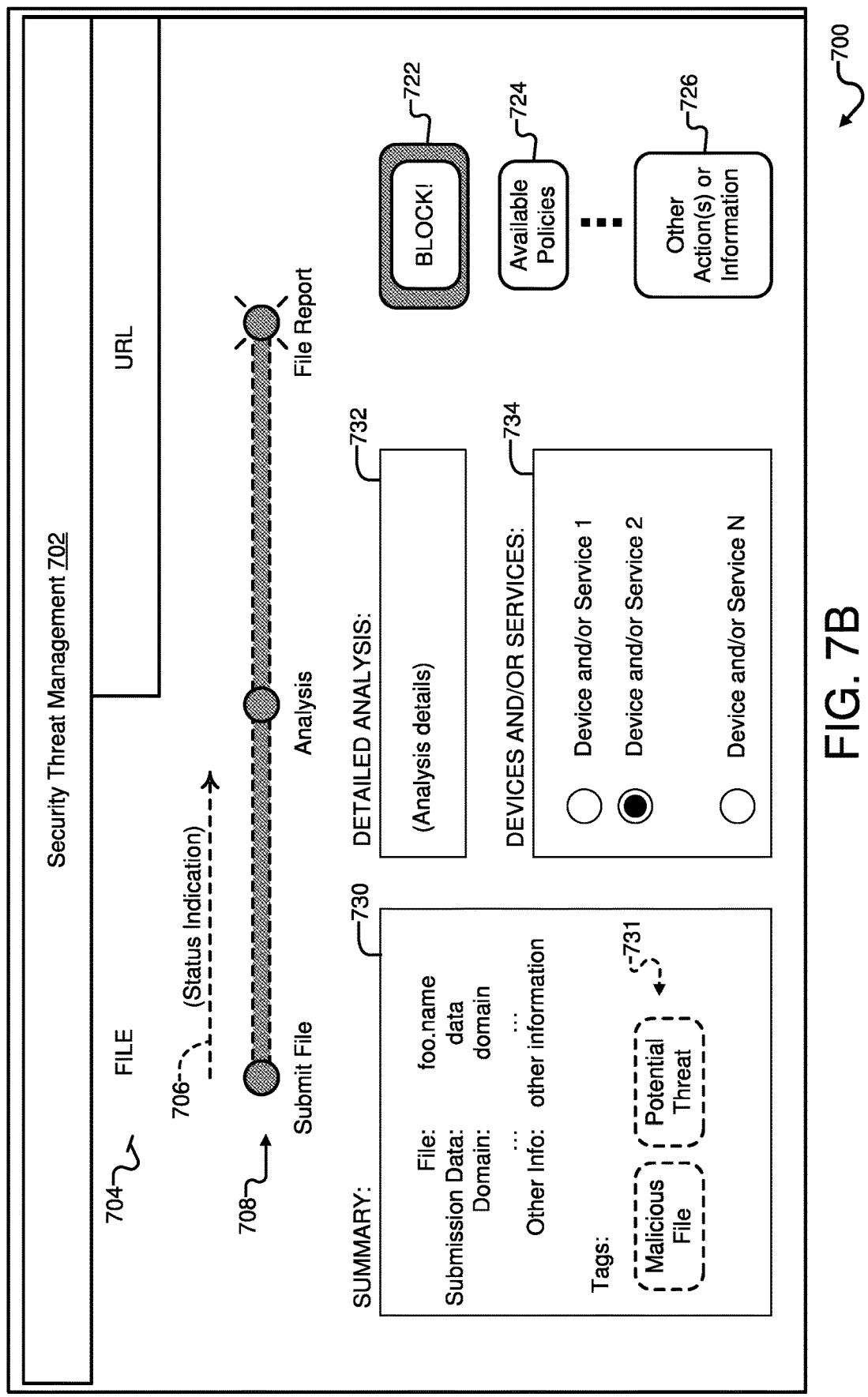
FIG. 7B is a diagram of an example user interface to manage enterprise network threats, in accordance with some implementations.

As shown in FIG. 7B, status indicator 708 (similar to 608) is presented indicating completion of analysis of the one or more network-accessible items submitted. A summary section 730 may be populated with summary information related to the analysis. In some implementations, flags or tags 731 indicating a summary of the threat status of the network-accessible item may be prominently displayed for immediate view by the user. The flags or tags 731 may also be used in a database of potential threats for sorting and/or ranking potential threats.

The summary section may be also be populated with an estimate of suspiciousness. For example, the user interface may present particular features in the summary section 730 such as whether a network-accessible item is signed, whether the network-accessible item contains encrypted code segments, and whether the network-accessible item has hash values at least partially associated with potentially malicious code. For each such feature, the user interface may further present the number of known good and known bad network-accessible items for that feature, or other summary information.

The features displayed may be a subset of features in a random forest over human-interpretable features that is selected based on relevance, e.g., how strongly indicative those features are of safety or suspiciousness. In one implementation, this may include features that are most heavily weighted on a percentage basis toward safety or suspiciousness. In another implementation, this may include features with the largest number of relevant samples (e.g., higher up the decision tree). In another implementation, these and any other factors may be weighted or otherwise collectively evaluated to select a subset of features for display to a user. This approach may usefully assist a human user when evaluating an intermediate threat for manual disposition by providing a display of features that contribute more significantly or most significantly to the potential risk associated with a network-accessible item.

In another implementation, the user interface may provide a display of a random forest output (e.g., quantitative data about various human-interpretable features), or a display of most similar safe and unsafe network-accessible items, or some combination of these. For example, the user interface may provide one or more user controls for the user to select among these different analyses, and/or other analyses, contextual information, or other supplemental information, in addition to the simplified example interface portions illustrated.

A detailed analysis portion 732 may also be presented. The detailed analysis portion 732 may be populated with information and/or data specific to the network-accessible item that was analyzed. The detailed analysis portion 732 may be populated with granular information about features contributing to suspiciousness. For example, an analysis of a network-accessible item may return a 90% suspicion of malicious code, while a file path analysis may return a 57% suspicion, and a hash analysis may return a 77% suspicion. While an integrative model may combine these various features into a single estimate of suspiciousness or potential risk, the individual values may be useful to a user attempting to manually dispose of an intermediate threat. Furthermore, for any particular feature, a number of most similar events or network-accessible items for that feature may be displayed, with similarity evaluated using, e.g., a k-nearest neighbor algorithm or other algorithm for evaluating similarity within a feature space. These more granular estimates of suspiciousness may be presented in separate sub-elements, which may usefully be arranged in an accordion, a stacked group of drop-down lists, or any other suitable control element or combination of control elements that permits each type of estimate to be expanded or collapsed under user control.

A listing 734 with selectable devices and/or services associated with a user and/or the network-accessible item may also be presented. As shown, individual devices and/or services may be displayed with associated selection elements proximate thereto. Other forms of selection may also be applicable.

As further shown, control elements 722, 724, and 726 are provided for user control of policies associated with the selectable devices and/or services. For example, "block" control element 722 allows the submission of a blocking request whereby all selected devices and services receive a deployed network access policy (e.g., as described with reference to FIG. 5). "Available policies" element 724 may present an additional listing of available policies that can also be deployed. Furthermore, additional actions, information, statuses, and other displays may be requested by selection of other control elements, which have been grouped as single element 726 for clarity.

Hereinafter, event graphs that may be advantageous in deploying the network access policy through use of the "block" control elements 622/722 (and associated actions by a threat management facility or other suitable element) are described in detail. For ease of discussion, the below description is based upon an example where the analyzed network-accessible item has been determined to be malicious, and a user or network administrator has issued the command to block the network accessible item through the "block" control elements 622/722. Accordingly, a "block event" has occurred whereby a network administrator desires to block access to the network accessible item by way of deploying the network access policy.

Figure 8:
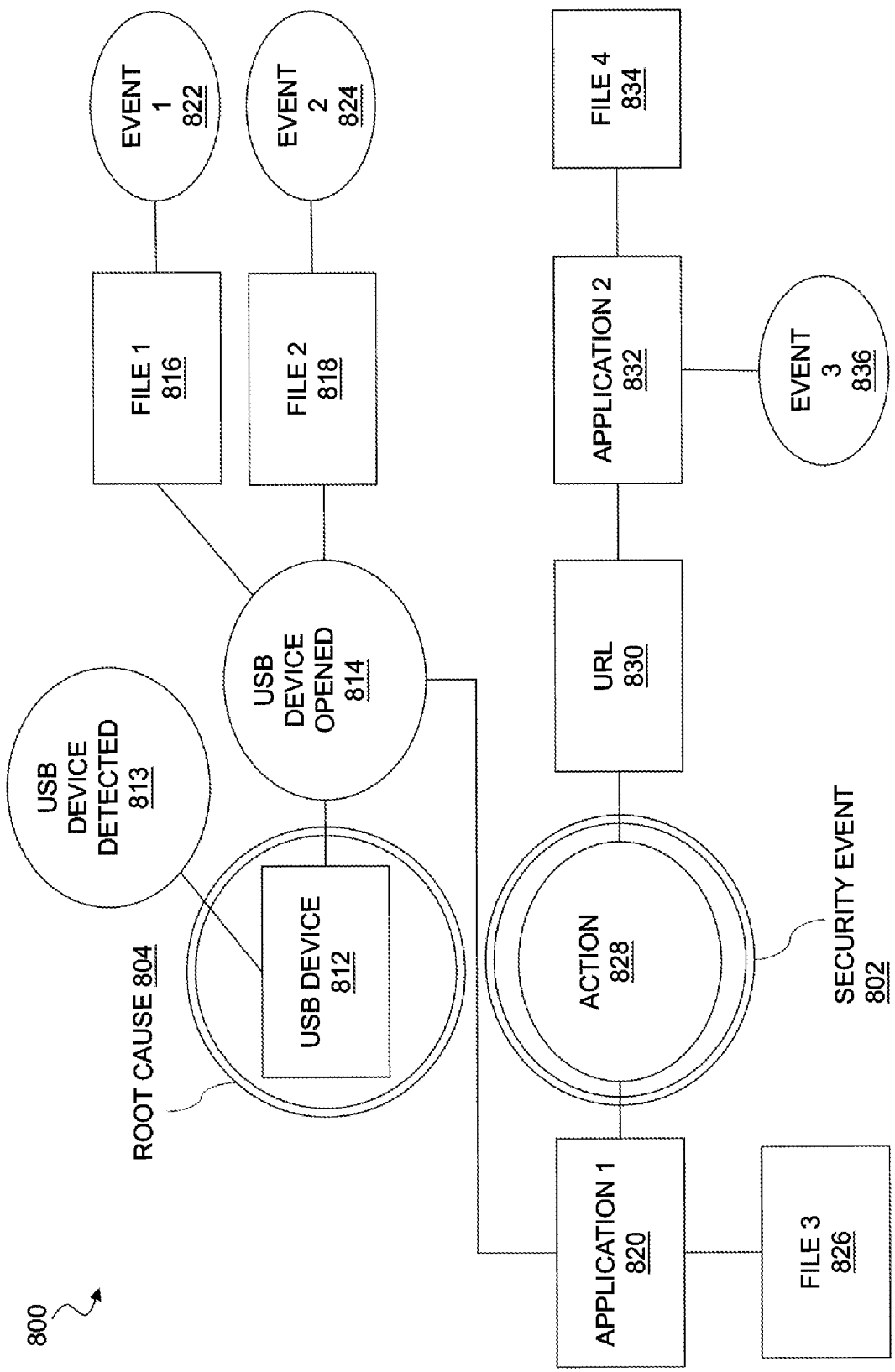
FIG. 8 is a diagram of a portion of an event graph, in accordance with some implementations.

Referring to FIG. 8, a graphical depiction of a portion of an example event graph 800 may be used in some embodiments for network access policy deployment and/or automatic blocking of the network-accessible item determined to be malicious. The event graph 800 may include a sequence of computing objects causally related by a number of events, and which provide a description of computing activity on one or more endpoints. The event graph 800 may be generated as a compute instance operates, or upon the occurrence of an event, for example, when a security event 802 is detected on an endpoint, and may be based on a data log or similar records obtained by an event data recorder during operation of the endpoint. The event graph 800 may be used to determine a root cause 804 of the security event 802. In this example, the security event 802 is an event where a network-accessible item has been determined to be malicious. The security event 802 may be submitted to the blocking service 180 or the blocking service 181, and/or the policy management facility 112.

The event graph 800 may also or instead be continuously, periodically and/or sporadically generated to serve as, or be a part of, the data log obtained by the data recorder 304. In any case, an event graph 800, or a portion of an event graph 800 in a window before or around the time of a security event, may be obtained and analyzed after a security event 802 occurs to determine its root cause 804. The event graph 800 depicted in FIG. 8 is provided by way of example only, and it will be understood that many other forms and contents for event graphs 800 are also or instead possible. It also will be understood that the figure illustrates a graphical depiction of an event graph 800, which may be stored in a database or other suitable data structure. Generation or presentation of the event graph may be directed or configured using information about a type of malware determined, as described herein.

By way of example, the event graph 800 begins with a computing object that is a USB device 812, which may be connected to an endpoint. Where the USB device 812 includes a directory or file system, the USB device 812 may be mounted or accessed by a file system on an endpoint to read its contents. The USB device 812 may be detected 813 and contents of the USB device 812 may be opened 814, e.g., by a user of the endpoint or provided for analysis according to the methods and GUIs described herein. The USB device 812 may include one or more files and applications, e.g., a first file 816, a second file 818, and a first application 820. The first file 816 may be associated with a first event 822, for example, by a determination that the first file 816 is potentially or actually malicious and/or based on the type of malware detected. The second file may be associated with a second event 824, for example, that it is potentially or actually malicious and/or based on the type of malware determined.

The first application 820 may access one or more files on the endpoint, e.g., the third file 826 shown in FIG. 8. The first application 820 may also or instead perform one or more actions 828, such as accessing a URL 830. Accessing the URL 830 may download or run a second application 832 on the endpoint, which in turn accesses one or more files (e.g., the fourth file 834 shown in FIG. 8) or is associated with other events (e.g., the third event 836 shown in FIG. 8).

In some implementations, a block of one of the events in the event graph may cause blocking of other events in the event graph. For example, if the first file 816 is blocked, it may also cause the traversal of the graph and the blocking of URL 830.

In the example provided by the event graph 800 depicted in FIG. 8, a blocked event 802 may include an action 828 associated with the first application 820, e.g., accessing the URL 830. By way of example, the URL 830 may have a determined reputation or an unknown reputation. The URL 830 may involve the downloading of file 834. When file 4 834 is downloaded, the blocking techniques described above may be applied, for example at a network gateway or at an endpoint, and a determination made that file 4 834 is potentially malicious and a type of malware determined as described herein.

In response to a blocking event 802, the event graph 800 may be traversed in a reverse order from a computing object associated with the blocking event 802 based on the sequence of events included in the event graph 800. For example, traversing backward from the action 828 leads to at least the first application 820 and the USB device 812. As part of a root cause analysis, one or more cause identification rules may be applied to one or more of the preceding computing objects having a causal relationship with the detected security event 802, or to each computing object having a causal relationship to another computing object in the sequence of events preceding the detected security event 802. For example, other computing objects and events may be tangentially associated with causally related computing objects when traversing the event graph 800 in a reverse order—such as the first file 816, the second file 818, the third file 825, the first event 822, and the second event 824 depicted in FIG. 8. In an aspect, the one or more cause identification rules are applied to computing objects preceding the detected security event 802 until a cause of the security event 802 is identified.

In the example shown in FIG. 8, the USB device 812 may be identified as the root cause 804 of the security event 802. In other words, the USB device 812 was the source of the application (the first application 820) that initiated the security event 802 (the action 828 of accessing the potentially malicious or otherwise unwanted URL 830). Events that are relevant, for example, events that are displayed to a user or to an administrator may be based at least in part on the type of malware that is determined as described herein.

The event graph 800 may be traversed going forward from one or more of the root cause 804 or the security event 802 to identify one or more other computing objects affected by the root cause 804 or the security event 802. For example, the first file 816 and the second file 818 potentially may be corrupted because the USB device 812 included malicious content. Similarly, any related actions performed after the security event 802 such as any actions performed by the second application 832 may be corrupted. Further testing or remediation techniques may be applied to any of the computing objects affected by the root cause 804 or the security event 802.

The event graph 800 may include one or more computing objects or events that are not located on a path between the security event 802 and the root cause 804. These computing objects or events may be filtered or 'pruned' from the event graph 800 when performing a root cause analysis or an analysis to identify other computing objects affected by the root cause 804 or the security event 802. For example, computing objects or events that may be pruned from the event graph 800 may include the USB drive 81 and the USB device being detected 813. Events that may be pruned may be determined by the type of malware, which may be determined as described herein. For example, for malware that is classified as a downloader, events involving URLs may be especially relevant. For example, for malware that is classified as ransomware, events interacting with files on the USB device may be relevant.

It will be appreciated that the event graph 800 depicted in FIG. 8 is an abstracted, simplified version of actual nodes and events on an endpoint for demonstration. Numerous other nodes and edges can be present in a working computing environment. For example, when a USB device is coupled to an endpoint, the new hardware can first be detected, and then the endpoint may search for suitable drivers and, where appropriate, present a user inquiry of how the new hardware should be handled. A user may then apply a file system to view contents of the USB device and select a file to open or execute as desired. The file contents may then be analyzed as described herein. These operations may require multiple operating system calls, file system accesses, hardware abstraction layer interaction, and so forth, which may be discretely represented within the event graph 800, or abstracted up to a single event or object as appropriate. Thus, it will be appreciated that the event graph 800 depicted in the drawing is intended to serve as an illustrative example only, and not to express or imply a particular level of abstraction that is necessary or useful for root cause identification as contemplated herein.

The event graph 800 may be created or analyzed using rules that define one or more relationships between events and computing objects. For example, the C Language Integrated Production System (CLIPS) is a public domain software tool intended for building expert systems, and may be suitably adapted for analysis of a graph such as the event graph 800 to identify patterns and otherwise apply rules for analysis thereof. While other tools and programming environments may also or instead be employed, CLIPS can support a forward and reverse chaining inference engine suitable for a large amount of input data with a relatively small set of inference rules. Using CLIPS, a feed of new data can trigger a new inference, which may be suitable for dynamic solutions to root cause investigations.

An event graph such as the event graph 800 shown in FIG. 8 may include any number of nodes and edges, where computing objects are represented by nodes and events are represented by edges that mark the causal or otherwise directional relationships between computing objects such as data flows, control flows, network flows and so forth. While processes or files can be represented as nodes in such a graph, any other computing object such as an IP address, a registry key, a domain name, a uniform resource locator, a command line input or other object may also or instead be designated to be represented as a node in an event graph as contemplated herein. Similarly, while an edge may represent an IP connection, a file read, a file write, a process invocation (parent, child, etc.), a process path, a thread injection, a registry write, a domain name service query, a uniform resource locator access and so forth other edges may be designated and/or represent other events. As described above, when a security event is detected, the source of the security event may serve as a starting point within the event graph 800, which may then be traversed backward to identify a root cause using any number of suitable cause identification rules. The event graph 800 may then usefully be traversed forward from that root cause to identify other computing objects that are potentially tainted by the root cause so that a more complete remediation can be performed.

Hereinafter, a more detailed description of various computing devices that may be used to implement different devices (e.g., the server 14 and/or endpoints 12, 22) illustrated in FIG. 1 and FIG. 2 is provided with reference to FIG. 9.

Figure 9:
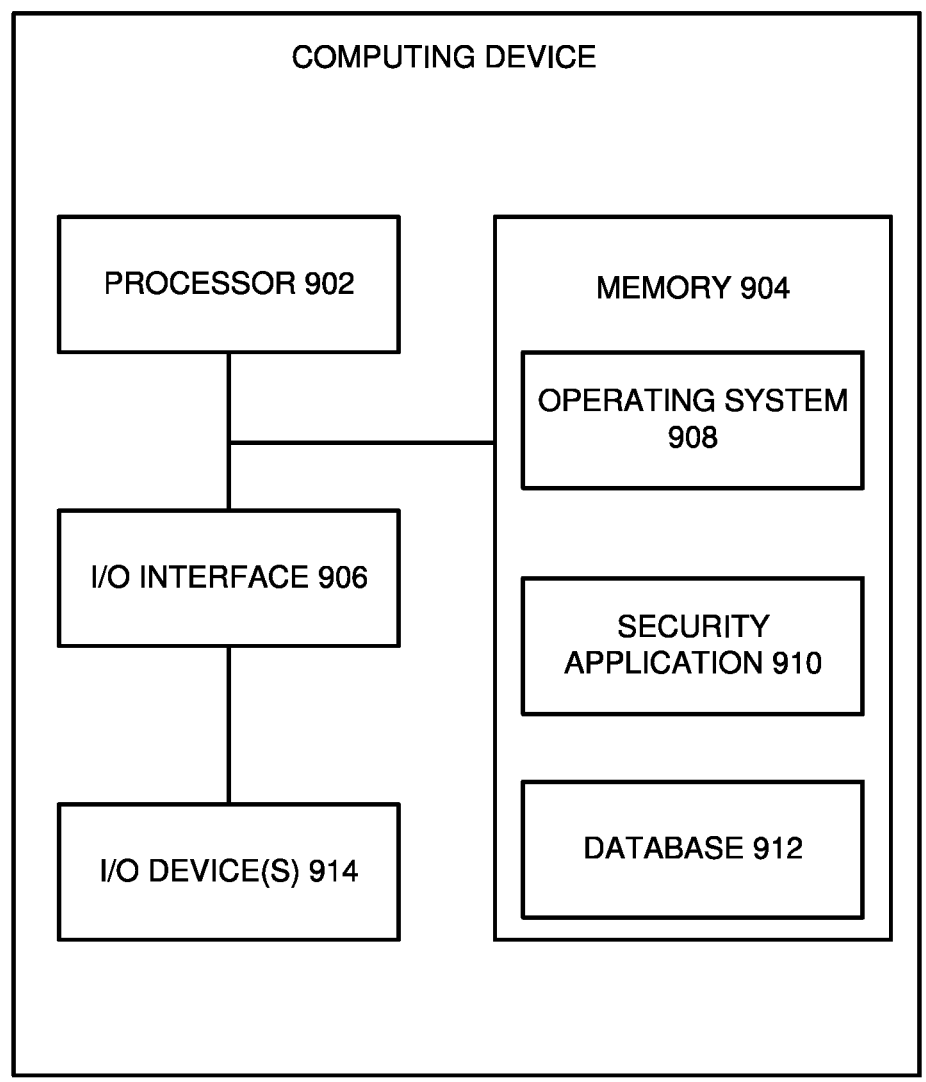
FIG. 9 is a block diagram illustrating an example computing device which may be used to implement one or more features described herein, in accordance with some implementations.

FIG. 9 is a block diagram of an example computing device 900 which may be used to implement one or more features described herein, in accordance with some implementations. In one example, device 900 may be used to implement a computer device, (e.g., 110 of FIG. 1), and perform appropriate method implementations described herein. Computing device 900 can be any suitable computer system, server, or other electronic or hardware device. For example, the computing device 900 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 900 includes a processor 902, a memory 904, input/output (I/O) interface 906, and audio/video input/output devices 914 (e.g., display screen, touchscreen, display goggles or glasses, audio speakers, microphone, etc.).

Processor 902 can be one or more processors and/or processing circuits to execute program code and control basic operations of the device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908, a security application or computer program product 910, and a database 912.

Memory 904 can include software instructions for executing the operations as described with reference to FIGS. 1-8. Any of software in memory 904 can alternatively be stored on any other suitable storage location or computer-readable medium. In addition, memory 904 (and/or other connected storage device(s)) can store instructions and data used in the features described herein. Memory 904 and any other type of storage (magnetic disk, optical disk, magnetic tape, or other tangible media) can be considered "storage" or "storage devices."

I/O interface 906 can provide functions to enable interfacing the server device 900 with other systems and devices. For example, network communication devices, storage devices (e.g., memory and/or data store 116), and input/output devices can communicate via interface 906. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 9 shows one block for each of processor 902, memory 904, I/O interface 906, software blocks 908, and 910, and database 912. These blocks may represent one or more processors or processing circuitries, operating systems, memories, I/O interfaces, applications, and/or software modules. In other implementations, device 900 may not have all of the components shown and/or may have other elements including other types of elements instead of, or in addition to, those shown herein.

A user device can also implement and/or be used with features described herein. Example user devices can be computer devices including some similar components as the device 900, e.g., processor(s) 902, memory 904, and I/O interface 906. An operating system, software and applications suitable for the client device can be provided in memory and used by the processor. The I/O interface for a user device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 914, for example, can be connected to (or included in) the device 900 to display images, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more user devices, servers, and threat management facilities. In some implementations, one or more methods described herein can be implemented, for example, on a server system with a dedicated threat management facility, and/or on both a server system and any number of threat management facilities. In some implementations, different components of one or more servers and or user devices can perform different blocks, operations, or other parts of the methods.

One or more methods described herein (e.g., method 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to deploy network policies to one or more computing devices or services, the computer-implemented method comprising:
   receiving a request from a user to analyze a network-accessible item for malicious activity,
      wherein the request includes an identification of the network-accessible item;
   determining that the network-accessible item is associated with the malicious activity;
   presenting, at a client device, a listing of selectable devices or services, wherein the listing is populated based on identifying data of the user;
   receiving, from the user, at least one selection from the listing of selectable devices or services;
   creating at least one network access policy based on the at least one selection; and
   deploying the at least one network access policy to a device or service associated with the at least one selection.

2. The computer-implemented method of claim 1, wherein presenting the listing of selectable devices or services comprises:
   presenting the listing of selectable devices and services in a graphical user interface (GUI),
      wherein the GUI comprises one or more selectable fields representative of the devices or services.

3. The computer-implemented method of claim 1, wherein presenting the listing of selectable devices or services comprises:
   presenting the listing of selectable devices and services through a web-based interface rendered by a centralized server.

4. The computer-implemented method of claim 1, wherein:
   the request to analyze the network-accessible item for malicious activity is received after providing the user with a graphical user interface (GUI) that includes a text field for the identification of the network-accessible item; and
   the network-accessible item to be analyzed for malicious activity is one or more of: a web address; one or more files; or a hash value of the one or more files.

5. The computer-implemented method of claim 4, wherein the web address is associated with a domain name, a website, a uniform resource locator (URL), or an Internet Protocol (IP) address.

6. The computer-implemented method of claim 1, wherein determining that the analyzed network-accessible item is associated with the malicious activity comprises determining that the network-accessible item matches one or more criteria associated with items that are known to be harmful to the client device.

7. The computer-implemented method of claim 1, wherein the listing of selectable devices or services comprises a listing of one or more of:
   endpoint devices;
   proxies;
   firewalls;
   switches; or
   gateway devices.

8. The computer-implemented method of claim 1, wherein the listing of selectable devices or services comprises a listing of one or more of:
   e-mail services;
   firewall services;
   anti-malware services; or
   anti-virus services.

9. The computer-implemented method of claim 1, wherein the at least one network access policy is a network access policy configured to prevent a corresponding network-accessible device from accessing the analyzed network-accessible item.

10. The computer-implemented method of claim 1, wherein the at least one network access policy is a network access policy configured to cause a corresponding service to prevent user accounts or devices from accessing the analyzed network-accessible item.

11. The computer-implemented method of claim 1, wherein the deployed at least one network access policy is implemented by the device or service associated with the at least one selection.

12. A computer program product comprising one or more non-transitory computer-readable media with instructions stored thereon that, responsive to execution by one or more processing devices, causes the one or more processing devices to perform operations comprising:
  receiving a request from a user to analyze a network-accessible item for malicious activity,
    wherein the request includes an identification of the network-accessible item;
  determining that the analyzed network-accessible item is associated with the malicious activity;
  presenting, at a client device, a listing of selectable devices and services responsive to the determination, wherein the listing is populated based on identifying data of the user;
  receiving, from the user, at least one selection from the listing of selectable devices and services;
  creating at least one network access policy based on the at least one selection; and
  deploying the at least one network access policy to a device or service associated with the at least one selection.

13. The computer program product of claim 12, wherein presenting the listing of selectable devices and services comprises:
  presenting the listing of selectable devices and services in a graphical user interface (GUI),
    wherein the GUI comprises one or more selectable fields representative of the devices and services.

14. The computer program product of claim 12, wherein presenting the listing of selectable devices and services comprises:
  presenting the listing of selectable devices and services through a web-based interface rendered by a centralized server.

15. The computer program product of claim 12, wherein determining that the analyzed network-accessible item is associated with the malicious activity comprises determining that the network-accessible item matches one or more criteria associated with items that are known to be harmful to the client device.

16. The computer program product of claim 12, wherein the listing of selectable devices and services comprises a listing of one or more of: endpoint devices, proxies, firewalls, switches, or gateway devices.

17. The computer program product of claim 12, wherein the listing of selectable devices and services comprises a listing of one or more of: e-mail services, firewall services, anti-malware services, or anti-virus services.

18. The computer program product of claim 12, wherein the at least one network access policy is a network access policy configured to prevent and/or prohibit a corresponding network-accessible device from accessing the analyzed network-accessible item, and further configured to instruct a corresponding service to prevent and/or prohibit user accounts or devices from accessing the analyzed network-accessible item.

19. The computer program product of claim 12, wherein the deployed at least one network access policy is consumed and implemented by the device or service associated with the at least one selection.

20. A threat management computer system to manage security threats on an enterprise network, comprising:
  a memory with instructions stored thereon;
  one or more processing devices, coupled to the memory, the one or more processing devices configured to access the memory and execute the instructions; and
  one or more network devices coupled to the one or more processing devices and configured to receive requests issued by a plurality of client devices, wherein the instructions cause the one or more processing devices to perform operations including:
    receiving a request from a user to analyze a network-accessible item for malicious activity, wherein the request includes an identification of the network-accessible item;
    determining that the analyzed network-accessible item is associated with the malicious activity;
    presenting, at a client device of the plurality of client devices, a listing of selectable devices and services responsive to the determination, wherein the listing is populated based on identifying data of the user;
    receiving, from the user, at least one selection from the listing of selectable devices and services;
    creating at least one network access policy based on the at least one selection; and
    deploying the at least one network access policy to a device or service associated with the at least one selection.

* * * * *